Dec. 17, 1940.                P. OBERMEIER                2,225,568
                            GYROSCOPIC DEVICE
                            Filed May 14, 1938
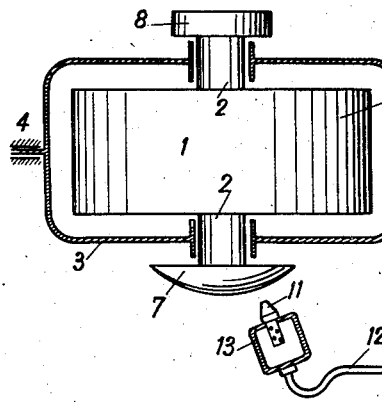
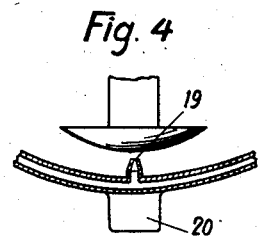
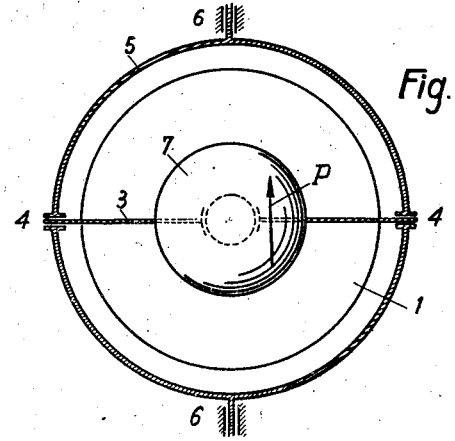
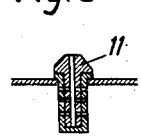
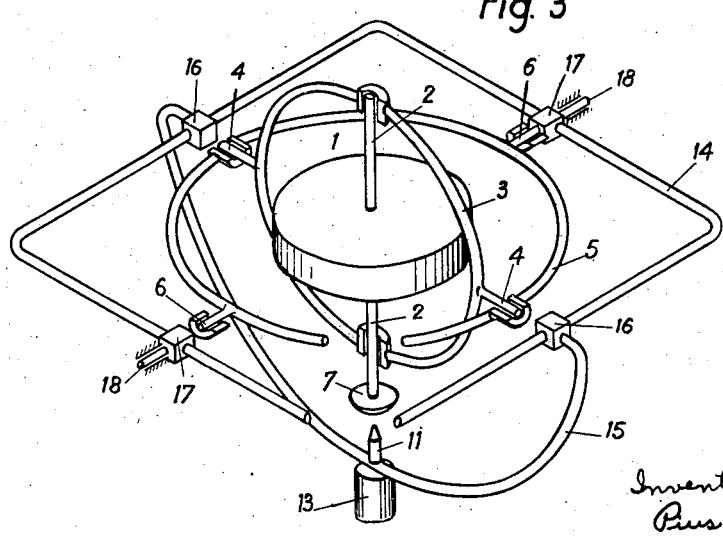
Inventor
Pius Obermeier
By Stephen Cerotvik
         attorney Patented Dec. 17, 1940

2,225,568

UNITED STATES PATENT OFFICE 2,225,568

GYROSCOPIC DEVICE

Pius Obermeier, Berlin-Wilmersdorf, Germany, assignor to Siemens Apparate und Maschinen Gesellschaft mit beschränkter Haftung, Berlin, Germany, a corporation of Germany Application May 14, 1938, Serial No. 208,062
In Germany May 15, 1937

4 Claims. (Cl. 74—5)

For changing the direction of the axis of rotation of a gyroscope preferably of the Cardan-ring suspended type, it has previously been suggested to provide a mechanical organ which serves as a generator of moment and positively engages a rotating part of the gyroscope supplying a moment of reaction for producing precession movements in the sense of adjustment of the axis of rotation of the gyroscope about the said organ.

This invention relates to an improvement in the said arrangement, which consists in causing the moment which serves for producing precessional movements to be supplied by a device engaging pneumatically or hydraulically, as for instance in the form of a gaseous or liquid jet, a rotating part of the gyroscope, preferably in a direction of engagement which is perpendicular to the axis of rotation.

Other particulars will result from the following description of the examples of execution shown in the drawing.

Figure 1 is a view of the arrangement of the gyroscope,

Figure 2 is a plan view from below of Figure 1,

Figure 3 is a view of the novel device combined with an artificial horizon,

Figure 4 is a view of an example of the jet arrangement, and

Figure 5 is a sectional view of the jet arrangement.

The gyroscope 1 shown in Figure 1 is mounted with its vertical axis of rotation 2—2 in a shaft supporting member 3. This member is supported with the trunnions of the inner Cardan joint axis in bearings 4, 4 of a Cardan frame 5 visible in Figure 2 and rotatably mounted in bearings 6—6 with the trunnions of the outer Cardan axis. The axis of rotation of the gyroscope carries at its lower end a cup-shaped flange 7 the outer surface of which has a spherical form. The centre of curvature of this spherical surface is in the point of intersection of the Cardan axes and since the gyroscope is suspended free of forces, this centre is simultaneously in the point of suspension of the gyroscope. A flange 8 mounted at the upper end of the axis of rotation of the gyroscope compensates for the weight of the flange 7. The inertia mass 9 of the gyroscope may be the rotor of an electromotor for any kind of current. But the rotor of the gyroscope may also be an inertia mass of any kind which can be rotated in a known manner through mechanical, pneumatical or hydraulical means.

The force P which is indicated by the arrow in Figure 2 and which supplies the moment of reaction serving for the orientation of the axis of rotation of the gyroscope is produced, according to the invention, through pneumatical or hydraulical means by a suitable device. This device is substantially formed of a nozzle 11 which, in its normal position, is directed towards the spherical surface of flange 7. A gas or liquid under pressure, such as compressed air or oil under pressure, for instance, is supplied to the said nozzle so that a jet of gas or liquid is directed from the nozzle onto the surface of the cup-shaped flange 7. The fluid under pressure is supplied by a flexible line 12 to a casing 13 into which the nozzle 11 also projects. This casing serves as cushion for the storage pressure for producing the fluid jet.

A form of execution of the nozzle 11 is shown in Figure 5. Mounted in the cover of the casing 13 is a pipe member which projects into the casing and which is provided with radial holes. In its extension, the nozzle 11 is also provided with a pipe member which is tightly inserted into the first pipe member. The said second pipe member is provided with holes corresponding to the holes of the first named pipe member and which can be adjusted with respect to the holes of the first named member, by rotating the nozzle, whereby it is also possible to adjust the fluid jet. The adjustment of the nozzle is effected by manual manipulation and rotation of the tubes relative to each other as disclosed in Fig. 5 and such adjustment can also be utilized to cut off the fluid jet completely.

The casing 13 has a pendular suspension which is such that the axis of the nozzle 11 is in the true vertical line. Then the casing 13 serves also as a pendular weight. The suspension can be effected through a particular universal joint, the Cardan axes intersecting advantageously in the point of suspension of the gyroscope. This has also for its result that the orifice or outlet of the nozzle remains in a constant distance from the spherical surface of the flange 7.

Figure 3 shows the use of the device as an implement of survey for a gyroscopic instrument serving as an artificial horizon for aircraft, by way of example. The horizon gyroscope 1 is mounted in the axial support 3 with a vertical axis of rotation. The trunnions 4—4 of the inner Cardan axis are mounted in the Cardan frame 5 which is rotatably mounted by means of the trunnions 6—6 of the outer Cardan axis.

The above described device is pendularly suspended in the gimbals 14, 15. The point of intersection of the Cardan axis of the said gimbals coincides with the point of suspension of the gyroscope. Both frames 14, 15 have a tubular section and serve as pipings for the fluid under pressure for producing the moment of reaction. At 16—16 and 17—17 articulations are provided which serve also for the deviation of the fluid. The fluid can be supplied in a known manner through the pipes 18—18. The frame 15 contains also a nozzle 11 the axis of which is vertically arranged and a pendular weight 13. The nozzle 11 may be formed in the manner shown in Figure 5 and is there indicated at 19 and shown as being provided with a weight 20. The gimbal carrying the nozzle 19 defines a pipe or conduit for conducting fluid pressure to the nozzle from any suitable source in a manner well known in the art. The point of suspension of the device 19, 20 could also be vertically located above or below the point of suspension of the gyroscope, then the surface of the flange 7 could have a corresponding form.

What is claimed is:

1. In a gyro vertical, the combination of a gyroscope comprising gimbals and a gyro rotor mounted in said gimbals for spinning about a normally vertical axis and for angular movement about two mutually perpendicular horizontal axes at right angles to said spin axis, means providing a substantially spherical surface connected with said rotor coaxially thereof, and pendulously mounted means carried by one of said gimbals for directing a jet of fluid against said spherical surface to thereby maintain said rotor spin axis in said vertical position.

2. In a gyro vertical, the combination of a gyroscope comprising gimbals and a gyro rotor mounted in said gimbals for spinning about a normally vertical axis and for angular movement about two mutually perpendicular horizontal axes at right angles to said spin axis, a substantially spherical surface connected with said rotor coaxially thereof, and nozzle means pendulously mounted on one of said gimbals for directing a jet of fluid against said spherical surface to thereby maintain said rotor spin axis in said vertical position.

3. In a gyro vertical, the combination of a gyroscope comprising outer and inner gimbals and a gyro rotor mounted in said gimbals for spinning about a normally vertical axis and for angular movement about two mutually perpendicular horizontal axes at right angles to said spin axis, means on said rotor presenting a surface of impact, nozzle means including a weight for pendulously mounting said nozzle means on said outer gimbal in proximity to said surface of impact for directing a jet of fluid against said surface to maintain said rotor spin axis in said vertical position, and means for controlling the intensity of said jet.

4. In a gyro vertical, the combination of a gyroscope comprising gimbal rings and a gyro rotor mounted in said gimbals for spinning about a normally vertical axis and for angular movement about two mutually perpendicular horizontal axes at right angles to said spin axis, a spherical surface carried by said rotor coaxially thereof, nozzle means pendulously mounted on one of said gimbal rings for directing a jet of fluid against said surface, and conduit means defined by one of said gimbal rings for conducting fluid to said nozzle.

PIUS OBERMEIER.